United States Patent [19]

Hotine

[11] Patent Number: 4,656,647
[45] Date of Patent: Apr. 7, 1987

[54] PULSED BI-PHASE DIGITAL MODULATOR SYSTEM

[76] Inventor: William Hotine, 633 Ramona Ave., Los Osos, Calif. 93402

[21] Appl. No.: 735,330

[22] Filed: May 17, 1985

[51] Int. Cl.[4] .............................................. H04L 27/20
[52] U.S. Cl. ...................................... 375/52; 375/67; 329/104; 332/10; 360/42
[58] Field of Search ................. 375/52, 57, 67, 68; 332/10; 329/104; 360/30, 42

[56] References Cited

U.S. PATENT DOCUMENTS

| | | | |
|---|---|---|---|
| 3,138,665 | 6/1964 | Chasek | 375/67 |
| 3,665,474 | 5/1972 | Thayer | 375/52 |
| 3,779,321 | 12/1973 | Landwer et al. | 375/52 |
| 3,946,337 | 3/1976 | Philips et al. | 375/52 |
| 4,112,369 | 9/1978 | Forman et al. | 375/52 |

Primary Examiner—Robert L. Griffin
Assistant Examiner—M. Huseman

[57] ABSTRACT

A short pulse of a small leading phase angle deviation of the carrier frequency at the start of a clock period and a short pulse of a small lagging phase angle deviation of the carrier frequency at the middle of a clock period encodes a digital one, while a short pulse of a lagging phase angle deviation of the carrier frequency at the middle of a clock period encodes a digital zero. Resistances are switched to directly deviate a low level carrier. The digital phase lock loop demodulator has an output digital one pulse derived from the negative pulse response of its phase comparator to the leading phase angle and has coherent clock pulses derived from its positive pulse response to the lagging phase angle at the middle of every bit. Information is contained in the abrupt pulses of phase transitions from an average constant phase carrier frequency. No reference carrier is needed for demodulation. The original modulated carrier and one side band may be eliminated and a single side band transmitted with a consequent relatively narrow frequency spectrum of the signal.

4 Claims, 5 Drawing Figures

PULSED BI-PHASE DIGITAL MODULATOR SYSTEM

BACKGROUND OF INVENTION

Previous digital modulator systems of the phase shift keyed type (PSK) or the differential phase shift keyed type (DPSK) have employed phase changes in a sine wave carrier frequency to encode digital logic levels. These previous systems have required a phase coherent reference frequency at their demodulator for comparison of phases of the incoming modulated carrier frequency with the phase coherent reference frequency. Error can be introduced by relative drifts of the master oscillator at transmitter or receiver or can be due to phase drift or fluctuation in the propagation path. In DPSK information is encoded differentially in terms of phase change between successive bits but a coherent detector is still required where one input is the current bit and the other input the previous bit. The clock frequency for these systems, necessary for demodulation of signals to logic levels is derived in some previous systems from the carrier; in others by using an edge detector of the digital one pulse rise and fall to synchronize a phase lock loop. In the latter case the digital word length is limited and stop bits of digital ones are required to keep the clock frequency synchronized in the event of a string of digital zeros. In these systems, the start of a bit is denoted by the start of a phase period which coincides with a clock period of time. One previous DSPK system called Manchester Coding inserts a phase transition in the center of every bit in addition to the transitions of DPSK, thus supplying clock synchronization pulses in every bit.

SUMMARY OF INVENTION

The present invention, in contrast to previous systems, employs pulsed phase changes of an average constant phase sine wave carrier frequency to encode digital logic levels. A digital one bit is encoded by a short pulse of a small leading phase angle of the carrier frequency at the start of a clock period and a short pulse of a small lagging phase angle of the carrier frequency at the middle of the clock period. A digital zero bit is encoded by a short pulse of a small lagging phase angle of the carrier frequency at the middle of a clock period. The bits are unambiguously identified by using this coding as only digital one bits have a leading phase angle pulse at the start of a clock period, and every bit including zeros will have a lagging phase angle pulse at the middle of the clock period, or 180° later in the clock frequency cycle. The invention therefore positively differentiates a digital one bit "from" a digital zero bit a period. The invention also provides a clock synchronization pulse from the lagging phase angle pulse in every bit.

The demodulator of the invention uses a digital phase lock loop adjusted to center on the average constant phase carrier frequency. The incoming sine wave carrier frequency is amplified and shaped to a logic level square wave while preserving the zero crossing point of the sine wave as the leading edge of the square wave, which is compared to the leading edge of the square wave from the phase lock loop voltage controlled oscillator, which has been locked to the carrier within a degree of phase. The short pulse of leading phase angle at the start of a digital one bit creates a short peak in the phase comparator output which is negatively polarized, while the short pulse of a lagging phase angle creates a short peak in the phase comparator output which is positively polarized. These peaks are of very small amplitude and are amplified, selected by diodes, integrated, and shaped to become digital logic level pulses. The negative peak becomes a digital one level pulse, and the positive peak, delayed 180°, becomes a digital clock pulse. When no negative peak is present, there is "a" digital zero level output instead of the digital one pulse.

In the invention, the clock frequency derived at the demodulator is fully coherent with the clock frequency at the modulator at all times regardless of fluctuations in the transmission path, and "full" synchronous operation of the invention system is possible, regardless of digital word length. Also, in the invention, error free operation is possible because diode selection of polarized pulses for the ones and zeros cannot err. The invention, by the use of short pulses of phase deviation from a continuous average constant phase carrier frequency, has a frequency spectrum with two main side bands spaced from the carrier at approximately one half of the average bit rate. The carrier and one side band may be filtered out and only one side band need be transmitted, with consequent economy of the frequency spectrum. The phase lock loop of the demodulator will lock to this sideband and demodulate the pulsed phase deviations which encode the digital data. No reference carrier is needed by the system of the invention. As noise on the received carrier disappears during the conversion of the carrier to a square wave, it has little deleterious effect on the system of the invention.

The modulation circuit of the present invention employs a stable sine wave carrier frequency at a peak to peak level of approximately 0.1 volt which is fed from a low impedance source follower buffer amplifier to the capacitor input of an approximately series resonant circuit at the carrier frequency consisting of a capacitor and an inductor in series. Two solid state semiconductor switches are connected in series with fixed resistors from the input and output of the inductor to ground, and the inductor output is coupled to a high impedance input buffer amplifier. The semi-conductor switches can be NPN bi-polar transistors with their emitters grounded through a small resistance. The fixed resistors are of a value which produces equal desired phase shifts. At small voltages the transistors act as variable resistances or for practical phase shift purposes, switches which can be controlled to be "opened" or closed by the base bias. At zero base voltage the collector to emitter resistance of the transistor is in the megohm range or practically "an" open circuit while at +5 V base bias this resistance is a few ohms or practically a closed circuit. If the resistance from the input of the inductor to ground is low and the resistance from the output of the inductor to ground is very high, a leading phase angle is generated at the network output. If the resistance from the input of the inductor to ground is very high and the resistance from the output of the inductor to ground is low, a lagging phase angle is generated at the network "the" output. If both resistances at output and input of the inductor are very high, there will be no phase shift of the carrier at the network output.

The transistor switch at the input of the inductor is driven by the output pulse of a first one shot multivibrator operating at a positive 5 volt logic level. This multivibrator is triggered by the rising edge of the output pulse from an AND gate with one input receiving the data signal and the other input receiving a 50% duty cycle square wave at the clock frequency from the input of a digital inverter.

The transistor switch at the output of the inductor is driven by the output pulse of a second one shot multivibrator triggered by the rising edge of the pulse received from the output of the digital inverter which is driven by the clock frequency. When a positive voltage is present at the inverter input, a zero voltage will be present at its output. The second multivibrator which is coupled to the inverter output will not drive its transistor base bias from zero while the first multivibrator will receive a trigger pulse when the AND gate is opened by a digital one data signal. The transistor switch at the input of the inductor will be closed and the carrier deviated to a leading phase angle.

During the next 50% of the duty cycle, a zero voltage is present at the inverter input and a 5 V. positive voltage is present at the inverter output. During this period the second multivibrator which is coupled to the inverter output will receive a positive 5V. trigger pulse timed to the middle of the modulation frequency cycle while the first multivibrator which is coupled to the inverter input will not drive its transistor base from zero. When the transistor switches are driven in this manner, one cycle of the clock or modulating frequency square wave produces alternating pulses of leading and lagging phase angles of the carrier frequency at the carrier output amplifier. When a digital zero is present at the AND gate input no pulses are transmitted from the inverter input to the first multivibrator and its coupled transistor base remains at a zero bias so that there is no phase shift of the carrier at the start of the clock frequency cycle. The digital information at the AND gate input has a repetition rate equal to the modulating frequency, so that a digital one will gate one cycle of the 50% duty cycle modulating frequency. The rise at the start of the cycle drives the semiconductor switch which produces a leading phase angle pulse of the carrier frequency, while the rise at the middle of the cycle drives the semiconductor switch which produces a lagging phase angle pulse of the carrier frequency. As the semiconductor switches are driven by pulses from the multivibrators the phase transitions of the carrier are equally abrupt.

It can be understood from the above description that a modulating frequency equal to the data clock frequency with 50% duty cycle square wave form will produce alternating equal pulses of leading and lagging phase angle deviations of the carrier at the output of the capacity-inductor series phase shift circuit network when a digital one is transmitted, while only lagging phase angle pulses of phase deviation are produced when a digital zero is transmitted.

The fixed resistors placed in series with each transistor switch in the phase shift network determine the magnitude of the phase angle deviations. The larger the resistances are, the smaller the phase angle deviations will be.

Demodulation of the bi-phase modulated carrier is easily accomplished by the use of a digital phase lock loop. The receiving sine wave signal from the bi-phase modulating system of the invention is applied to the input of a squaring amplifier circuit having a square wave output at the digital logic level. This square wave signal is applied to the phase comparator of the digital phase lock loop with the output of the voltage controlled square wave oscillator of the loop as a phase reference. The abrupt bi-phase deviations of a digital one input signal are "seen" as momentary peaks in the output of the Type II phase comparator and appear as pulses at the low pass filter for the voltage controlled oscillator. The bi-phase modulation causes a negative and a positive pulse to appear at the loop filter. The negative pulse is caused by the phase deviation to a leading phase angle at the start of a digital one period. These pulses are inverted and the resulting positive pulse which was originally negative, is passed through a diode to a resistance capacitance integrating circuit. The diode cuts off the undesired negative part of the signal, leaving a positive pulse which is integrated, shaped and squared by an amplifier to a logic level digital one square pulse. This demodulated digital one pulse is synchronous with the original data bit at the modulator. During a digital zero modulating period there are no negative peaks at the phase comparator output and a consequent zero level voltage at the squaring amplifier output. However, during a digital one or a digital zero period there will be a positive pulse at the low pass filter.

Recovery of the digital clock frequency for coherent recovery of the data signal may be accomplished by the use of these positive pulses, which are integrated, amplified, shaped and squared, and used to synchronize a second digital phase lock loop at the clock frequency.

In one aspect of the invention, the carrier may be transmitted by radio or cable. The bi-phase angle modulation employed in the present invention for transmission produces two main side bands spaced from the carrier by approximately one half the bit rate frequency. Either one of these side bands carries sufficient information for proper data demodulation at the receiver. A band pass filter can pass one side band and eliminate the carrier and the other side band, thus reducing the band width of the spectrum of the transmitted signal. The transmitted side band can be heterodyned to any desired frequency for transmission.

In a second aspect of the invention, the carrier may be stored for future use by recording it on a suitable medium, such as magnetic tape or disc. In this application, the sine wave of the carrier is linearly recorded, with its frequency chosen to be the highest for the recording medium and its system. The modulating frequency is made as high as possible for best magnetic storage density. After the linear read out of the recorded sine wave, the reproduced carrier with its bi-phase modulation may be demodulated by phase lock loop as described above with accurate carrier and data recovery.

Accordingly, it is an object of the invention to provide a means for definitely identifying the bits of the binary code by their signal characteristics when phase modulating a carrier for digital transmission of information.

Another object of the invention is to provide a means for definitely recognizing signal characteristics of the identifiable bits of the binary code when receiving and demodulating a phase modulated carrier for digital transmission of data with coherent clock frequency recovery.

A further object of the invention is to provide a means for storage of definitely identifiable bits of the binary code by the linear recording of a sine wave carrier on a recording medium.

Another object of the invention is to provide a means for coherent digital data bit recovery from a linear recording of a sine wave carrier by definitely recognizing identified bits of a stored sine wave carrier and using the stored carrier as a reference for deriving a coherent clock frequency for the data bits.

For a better understanding of the invention and its advantages, and objects attained by its use, reference should be had to the accompanying drawings and to the accompanying description, in which there is illustrated and described two preferred embodiments of the invention.

DESCRIPTION OF THE FIRST PREFERRED EMBODIMENT

Figure 1:
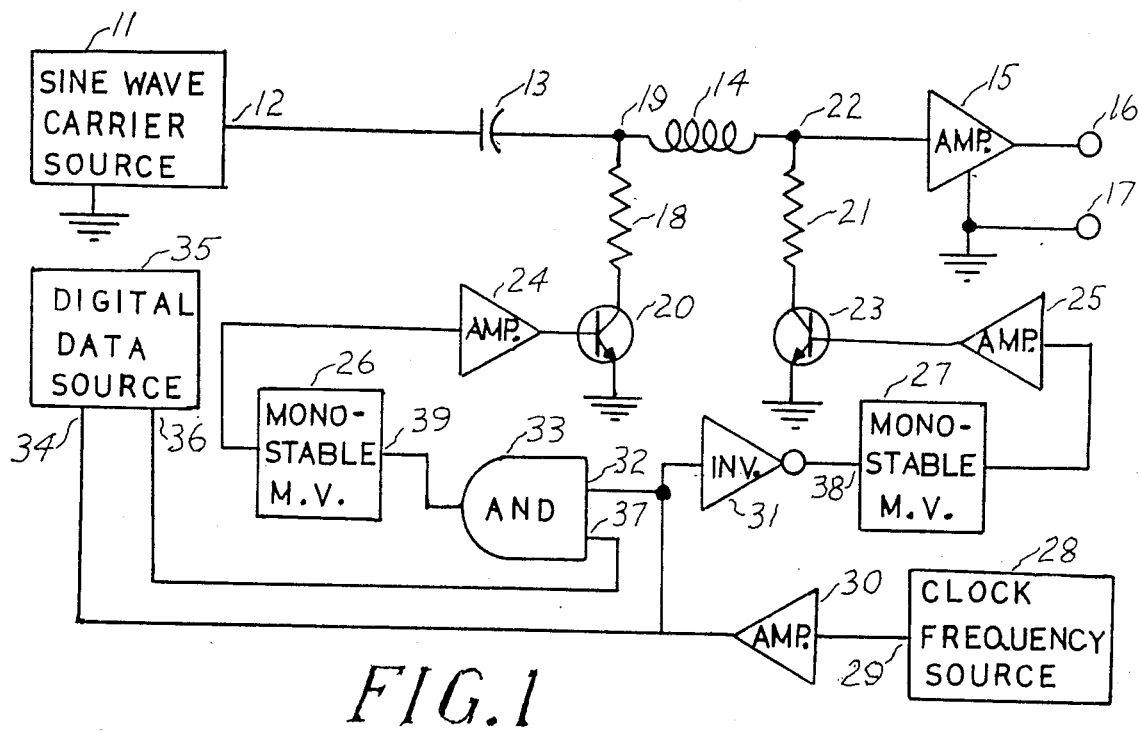
FIG. 1 is the schematic diagram of a circuit for the bi-phase digital modulation of a sine wave carrier by a digital data source of serial logic signals.

With reference to FIG. 1 which is a schematic diagram of a circuit for the bi-phase modulation system of the invention, rectangular block enclosure 11 denotes the circuit of a stable generator of a carrier frequency having an output of approximately one tenth volt peak to peak of a sine wave having a low percentage of distortion. Circuit 11 may consist of an oscillator and a buffer amplifier having a low impedance output at terminal 12 and with the low side grounded. The output 12 of generator 11 drives the capacitor 13 of the series circuit composed of capacitor 13 and inductor 14. The output of inductor 14 drives the high impedance input of the output buffer amplifier 15. The output of amplifier 15 is coupled to output terminal 16 with low side connected to the output ground terminal 17. Terminals 16 and 17 are the output terminals of the carrier frequency phase shift modulator circuit.

Phase shift resistor 18 is connected from the junction point 19 at the input of inductor 14 to the collector of transistor 20 which acts as a semiconductor switch, with its emitter grounded. Phase shift resistor 21 is connected from the junction point 22 at the output of inductor 14 to the collector of transistor 23 which acts as a semiconductor switch, with its emitter grounded.

The values of resistors 18 and 21 are selected for the desired phase shifts of the carrier frequency which may be from 10 to 30 degrees, in conjunction with the selection of the values of capacitor 13 and inductor 14. Alternatively to the bipolar transistor switches shown, other types of semiconductor switches may be used, such as field effect transistors or diodes, with suitable drive circuits.

The base of semiconductor switch 20 is driven by the output of a non-inverting digital buffer amplifier 24 while the base of semiconductor switch 23 is driven by the output of a non-inverting digital buffer amplifier 25. Amplifier 24 is driven by the output pulse of a first monostable multibrator 26, while amplifier 25 is driven by the output pulse of a second monostable multivibrator 27. Each multivibrator is triggered by the rising edge of an input pulse and their output pulses are made equal in width, with a desired pulse width of one half or less of the clock frequency cycle. The output pulses of the multivibrators drive the buffers, which in turn drive the bases of the transistors positive. These pulses may be shaped by additional circuits for best performance of the system. When a multivibrator is quiescent the semiconductor switch it drives is open.

When transistor switch 20 has its base at zero bias, the carrier frequency current through the first loop of the output resistance of generator 11, capacitor 13, point 19, resistor 18, transistor 20 and ground will have a very small leading phase angle. Also, when transistor 23 has its base at zero bias, the carrier frequency current through the second loop of transistor 20, resistor 18, inductor 14, point 22, resistor 21, transistor 23 and ground will have a very small lagging phase angle. The current through the second loop is supplied by the voltage at point 19, which is the voltage drop across resistor 18 and transistor 20 caused by the current in the first loop. The carrier voltage at point 22 will be approximately in phase with the carrier voltage at the output 12 of generator 11 when the bases of both transistors 20 and 23 are at zero bias.

If the base of transistor 20 is driven positive with the base of transistor 23 at zero bias, the current through the first loop will have a leading phase angle, the tangent of which is the ratio of the value of the negative reactance of capacitor 13 divided by the value of the resistance 18, so that the voltage at point 19 will have a leading phase angle, which is transmitted with very small change through the second current loop to the amplifier 15 and output terminal 16.

If the base of transistor 23 is driven positive with the base of transistor 20 at zero bias, the voltage supplied to the second current loop at point 19 will be approximately in phase with the carrier output voltage from generator 11. However, the current through the second loop will have a lagging phase angle, the tangent of which is the ratio of the value of the reactance of inductor 14 divided by the value of resistance 21, so that the voltage at point 22 will have a lagging phase angle which is transmitted by amplifier 15 to output terminal 16.

The rectangular enclosure 28 denotes a generator of a modulating frequency and digital data clock frequency and has a 50% duty cycle square wave form of positive 5 volt digital logic level. The modulating frequency output 29 of generator 28 is connected to the input of a digital buffer amplifier 30, and the output of buffer 30 is connected to the input of a digital inverter 31, to the input 32 of digital AND gate 33 and to the clock frequency input terminal 34 of a data source, or digital processing circuit 35 which has an output terminal 36. The digital data serial output is preferably of positive 5 volt logic level, and output 36 is connected to input 37 of AND gate 33. The output of inverter 31 is connected to trigger input 38 of second multivibrator 27, and the output of AND gate 33 is connected to the trigger input 39 of first multivibrator 26.

When a digital one from output 36 appears at input 37 of AND gate 33, this gate is enabled to pass the positive pulses of the modulating frequency at AND gate input 32.

During the first half of the duty cycle of the modulating frequency, as it goes positive, the input of inverter 31 will be high, together with input 32 of AND gate 33, while the output of the inverter 31 will be low, together with input 38 of multivibrator 27. The AND gate 33 is enabled by the high input of the one at input 37, and its output will be high, triggering first multivibrator 26. As input 38 of multivibrator 27 is low, its output will be low. Consequently, the base of transistor 20 is driven positive and the base of transistor 23 is at zero bias. During the period of the output pulse width of multivibrator 26 the carrier frequency at output terminal 16 will have a leading phase angle.

At the second half of the duty cycle of the modulating frequency, the input of inverter 31 will be low, together with input 32 of AND gate 33, while the output of inverter 31 will rise to high together with input 38 of multivibrator 27. The output of AND gate 33 is cut off by the low input at 32. As multivibrator 27 is triggered, its output pulse will drive buffer 25 and the base of transistor 23. Consequently, the base of transistor 23 is biased positive and the base of transistor 20 is at zero bias. During the period of the pulse width of multivibrator 27 the carrier frequency at output terminal 16 will have a lagging phase angle.

When a digital zero appears at output 36 of circuit 35 and at the input 37 of AND gate 33, the AND gate is cut off, so that its output remains low and the base of transistor 20 is at zero bias. However, at the start of the second half of the modulating frequency multivibrator 27 will be triggered and will drive the base of transistor 23 positive. During the period of the pulse width of multivibrator 27 the carrier frequency at output terminal 16 will have a lagging phase angle.

During a digital one signalling period, the carrier output at terminal 16 will alternately have a pulse period of a leading phase angle at the start of the one and a sequential pulse period of a lagging phase angle at the middle of the one which is produced by the modulating circuit as described above. During the middle of a digital zero signalling period, the carrier output at terminal 16 will have a pulse period of a lagging phase angle, so that there is no ambiguity between digital zeros and ones in the modulation system of the invention. The invention therefore provides positive identification of the bits, and also identifies the start of a digital one period by the start of a leading phase angle deviation of the carrier.

The resistors 18 and 21 are selected to give approximately equal leading and lagging phase angles with the capacitor 13 and inductor 14 when transistor switches 20 and 23 are closed by positive base bias. Phase angles of 10 to 30 degrees may be employed. The positive logic of the circuit has a logic level of 5 volts to simplify operation. CMOS integrated circuit digital devices are preferable. Current limiting resistors may be used to minimize current drawn by the transistor bases.

The carrier frequency output at terminal 16 may be further amplified if desired and its frequency multiplied if desired.

Multiplying its frequency will also multiply the phase angle deviation. The carrier frequency output at terminal 16 may also be heterodyned to a higher frequency without multiplying the phase angle deviation if preferable.

The modulating system of the invention causes two main side bands to be produced, which are spaced at a frequency approximately equal to one half of the bit rate each side of the carrier frequency. As one of these side bands carries sufficient information for demodulation of the bits, a band pass filter may be used after modulation to pass one side band and reject the carrier and the other side band. The transmitted side band may be heterodyned to a higher frequency if desired.

The transmitted upper side band will have a frequency which is approximately the sum of the carrier frequency plus one half of the modulating frequency, after filtering out the carrier and the lower side band. If this upper side band is received on a superheterodyne type receiver, the transmitted side band will be heterodyned to the receiver I.F. frequency, which will contain the phase deviations of the modulation. This I.F. frequency output, when applied to the demodulating phase lock loop, will cause negative and positive peaks in the P.L.L. Type II phase comparator output for the bi-phase deviations denoting a digital one. Therefore, it can be understood that the demodulator circuit of the invention is not dependent on a reference carrier phase which has been the case with the demodulator circuits used in previous phase shift keyed modulation systems. The demodulator of the present invention, instead of using a reference phase, tracks the abrupt phase deviations which are a result of the square wave form of the pulses of the modulating frequency, and produces polarized pulses as a response to the abrupt phase transitions. The use of equal and opposite pulses of phase angle deviations of the carrier to denote a digital one results in an average low pass filter output voltage for the loop voltage controlled oscillator which is approximately equal to the voltage from the filter output from an undisturbed carrier. This fact allows the accurate tracking and response to small bi-phase deviations.

The frequency spectrum of the transmitted single side band is relatively narrow. In practice, a single side band modulated by 20 kilobits per sound has been received and demodulated with a receiver having an I.F. amplifier band width of 4 kilohertz when using the modulation system of the invention at a carrier frequency of 21.4 megahertz with a bi-phase deviation of 30°.

Figure 2:
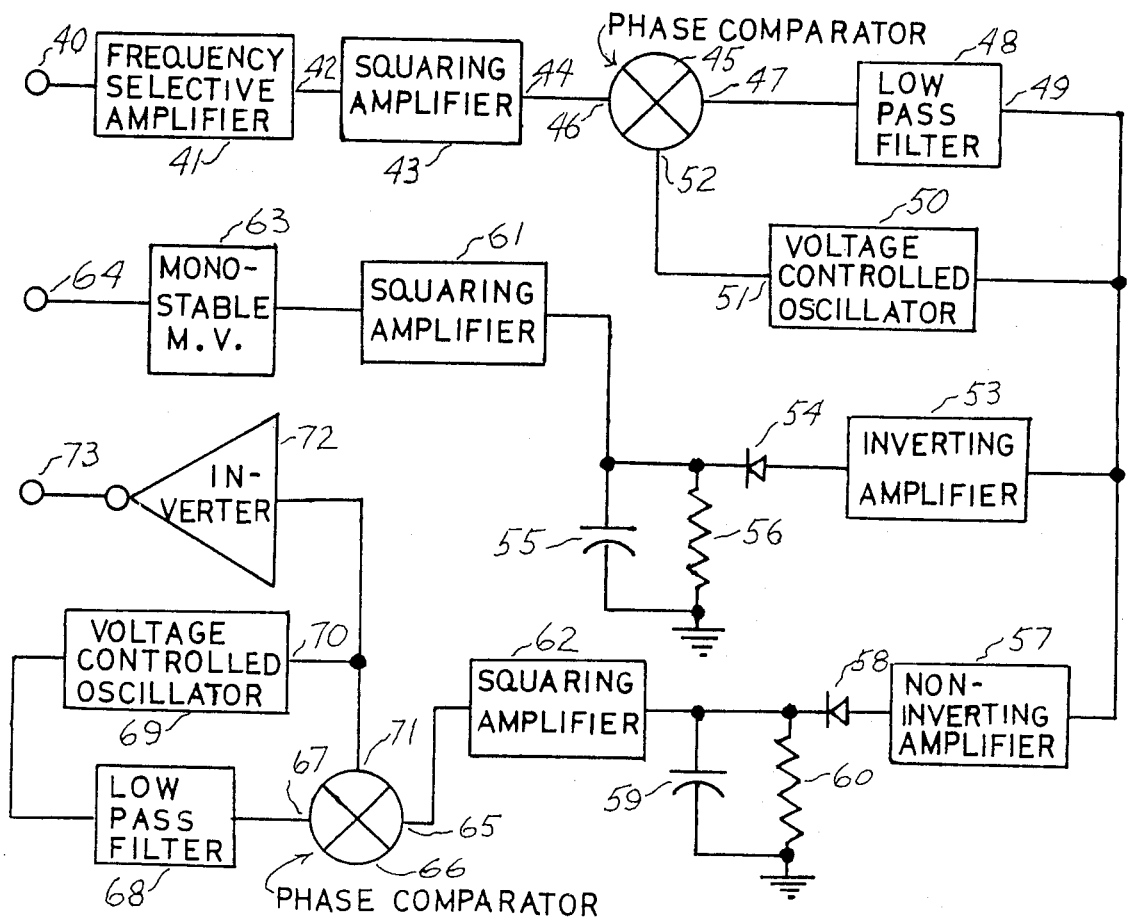
FIG. 2 is the schematic diagram of a circuit for the demodulation of a sine wave carrier which has been bi-phase digitally modulated according to the circuit of FIG. 1, with a demodulated output of serial logic signals and a coherent clock frequency.

With reference to FIG. 2, which is a schematic diagram of a receiver and demodulating circuit for the digitally modulated carrier produced by the modulating circuit of FIG. 1, an input terminal 40 receives a digitally modulated carrier input from a cable or antenna. The input terminal 40 is connected to the input circuit of a frequency selective amplifier 41 such as a superheterodyne radio receiver. The intermediate frequency output 42 of the receiver 41 is connected to the input of a squaring amplifier 43. The squaring amplifier 43 may consist of a series of CMOS digital inverter stages of type 4049, each one of which is biased to class A by a feedback resistor, and capacity coupled at their inputs. These inverter stages are operated at the digital logic level of the demodulator system digital components. The sine wave output signal at the intermediate frequency of receiver 41 at output 42 may have a value of 0.2 volt peak to peak. Three of the inverter stages of amplifier 43 will symmetrically amplify this sine wave to a 12 volt logic level square wave, which can be directly coupled to the input of a fourth inverter. The fourth inverter is preferably connected to the input of a CMOS Schmitt trigger of type 4093. The inverted output of this trigger is the output 44 of the squaring amplifier 43, which transforms its 0.2 volt peak to peak sine wave input signal into a square wave having a very steep rising edge which is timed very closely to the start of the positive cycle of the sine wave carrier as it passes through zero. Noise pulses which are received with the carrier are amplified together with the sine wave carrier, and disappear above the logic level voltage in the flat top of the square wave output of squaring amplifier 43, while at the same time, the timing of the start of the positive cycle of the sine wave is preserved. As this timing contains the phase information of the carrier, the squaring amplifier 43 serves as a noise limiter and further, enables the use of the very steep rising edge of the square wave at output 44 to be used in a very accurate digital phase comparator 45 which is preferably a type II comparator of a CMOS digital phase lock loop of type 4046. The output 44 of amplifier 43 is connected to input terminal 46 of the phase comparator 45. The output 47 of the phase comparator 46 is filtered by external low pass filter 48. The output 49 of low pass filter 48 is connected to the input of the voltage controlled oscillator circuit 50 which has a center frequency equal to the carrier frequency. The square wave output 51 of the oscillator 50 is connected to input 52 of phase comparator 45.

The phase comparator 45 compares the positive rising edges of the square waves at its inputs 46 and 52, and causes internal drivers to be turned on for a time corresponding to the frequency and phase differences at these inputs. During phase lock, the capacitor voltage of the low pass filter 48 is adjusted until the oscillator output at 52 and the signal at 46 are equal in both frequency and within a degree of phase. A detailed description of the action of this phase comparator is given in RCA publication CMS-272 on page 109, so is omitted here.

At the start of a digital one signal, the abrupt transition of the carrier to a leading or negative phase angle results in a momentary phase error signal at the output of the comparator 45 which appears as a negative peak in the output 49 of low pass filter 48. This peak is reduced to zero in a short time by the action of the phase lock loop. At the center of the digital one signal, the abrupt transition of the carrier to a lagging or positive phase angle results in a momentary phase error signal which appears as a positive peak in the output 49 of low pass filter 48. This peak is also reduced to zero in a short time by the action of the phase lock loop. The output signal at 49 is applied to the input of digital inverter 53. The negative peak at output 49 is inverted by inverter 53 and appears as a positive peak at the anode of diode 54, passing through this diode to the integrating circuit of capacitor 55 and resistor 56. Diode 54 cuts off the negative part of the signal output of inverter 53 which was the original position peak at output 49. The output signal at 49 is also applied to the input of non-inverting buffer amplifier 57. The positive peak at output 49 is buffered and appears as a positive peak at the anode of diode 58, passing through this diode to the integrating circuit of capacitor 59 and resistor 60. Diode 58 cuts off the negative part of the signal output of buffer 57.

The positive pulse formed by the integrating circuit at capacitor 55 and resistor 56 is coupled to the input of squaring amplifier 61, while the positive pulse formed by the integrating circuit of capacitor 59 and resistor 60 is coupled to the input of squaring amplifier 62. These squaring amplifiers may consist of a series of CMOS inverter stages of type 4049 each one of which is biased to class A by a feedback resistor, and capacity coupled at their inputs. These inverter stages are operated at the digital logic level. The pulse signal at the input of amplifier 61 may have a value of 0.05 volts peak. Four of these stages will amplify the positive pulse to a 12 volt digital logic level pulse the rising edge of which can be used or differentiated to trigger the input of a one shot multivibrator 63, the output pulse of which is made to have the duration of a digital one or less, and appears as the logic level output at terminal 64. There will be zero output at terminal 64 during a digital zero period.

The output of squaring amplifier 62 is applied to the input terminal 65 of phase comparator 66 of a second digital phase lock loop which is used for clock recovery. The output 67 of the phase comparator 66 is filtered by low pass filter 68. The output of filter 68 is connected to the input of the voltage controlled oscillator circuit 69, which has a center frequency equal to the clock frequency. The square wave output 70 of oscillator 69 is connected to the input terminal 71 of phase comparator 66. The comparator 66 compares the rising edges of the square pulses at inputs 65 and 71. The pulse output of amplifier 62 has a leading edge which rises at the center of every clock period, produced by the lagging phase angle deviation of the carrier, so that synchronization of the clock recovery phase lock loop takes place on each of these positive pulses. As the rising edge of the square wave output 70 of oscillator 69 is synchronized with the center of the original clock period at the modulator, the output 70 is connected to drive the input of a digital inverter 72, which inverts the rising edge at output 70 to a falling edge at the inverter output. The rising edge of the inverter output square wave is then in synchronism with the original clock frequency square wave at the modulator, and is connected to the clock frequency output terminal 73. The data is output terminal 64 may be processed as desired, using the coherent clock frequency at output terminal 73.

DESCRIPTION OF THE SECOND PREFERRED EMBODIMENT

Figure 3:
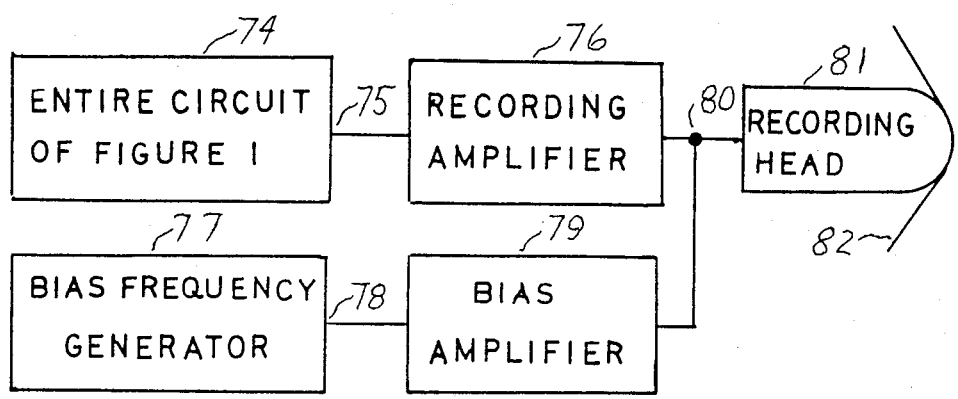
FIG. 3 is the schematic diagram of a circuit for the bi-phase digital modulation of a sine wave carrier, and storage of carrier on a recording medium such as magnetic tape.

With reference to FIG. 3, which is a schematic diagram of a digital modulator and tape recorder circuit for use in storing a carrier for future use, the rectangular enclosure 74 denotes the entire circuit of FIG. 1. The carrier frequency is made as high as possible for the recording equipment used. The digitally modulated sine wave carrier output 75 is coupled to the input of recording amplifier 76. The enclosure 77 denotes a bias frequency oscillator circuit, which generates a supersonic bias frequency in the range 50–100 kilohertz, and has an output 78 which is coupled to the input of amplifier 79. The outputs of recording amplifier 76 and bias amplifier 79 are combined at point 80 and drive the recording head 81. Magnetic tape 82 is transported across the gap of the head 81 by a transport mechanism not shown. The tape speed is preferably high. The sine wave carrier at the output 75 of digital modulator system 74 is linearly recorded on the magnetic tape 82 together with its digital phase shift information.

Figure 4:
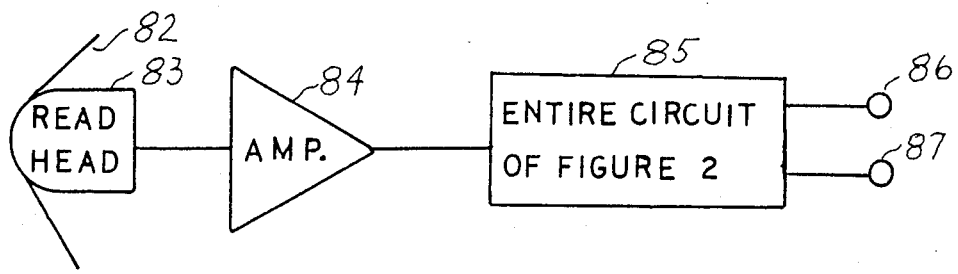
FIG. 4 is the schematic diagram of a circuit for the demodulation of a stored sine wave carrier picked up from a recording medium such as magnetic tape.
Figure 5:
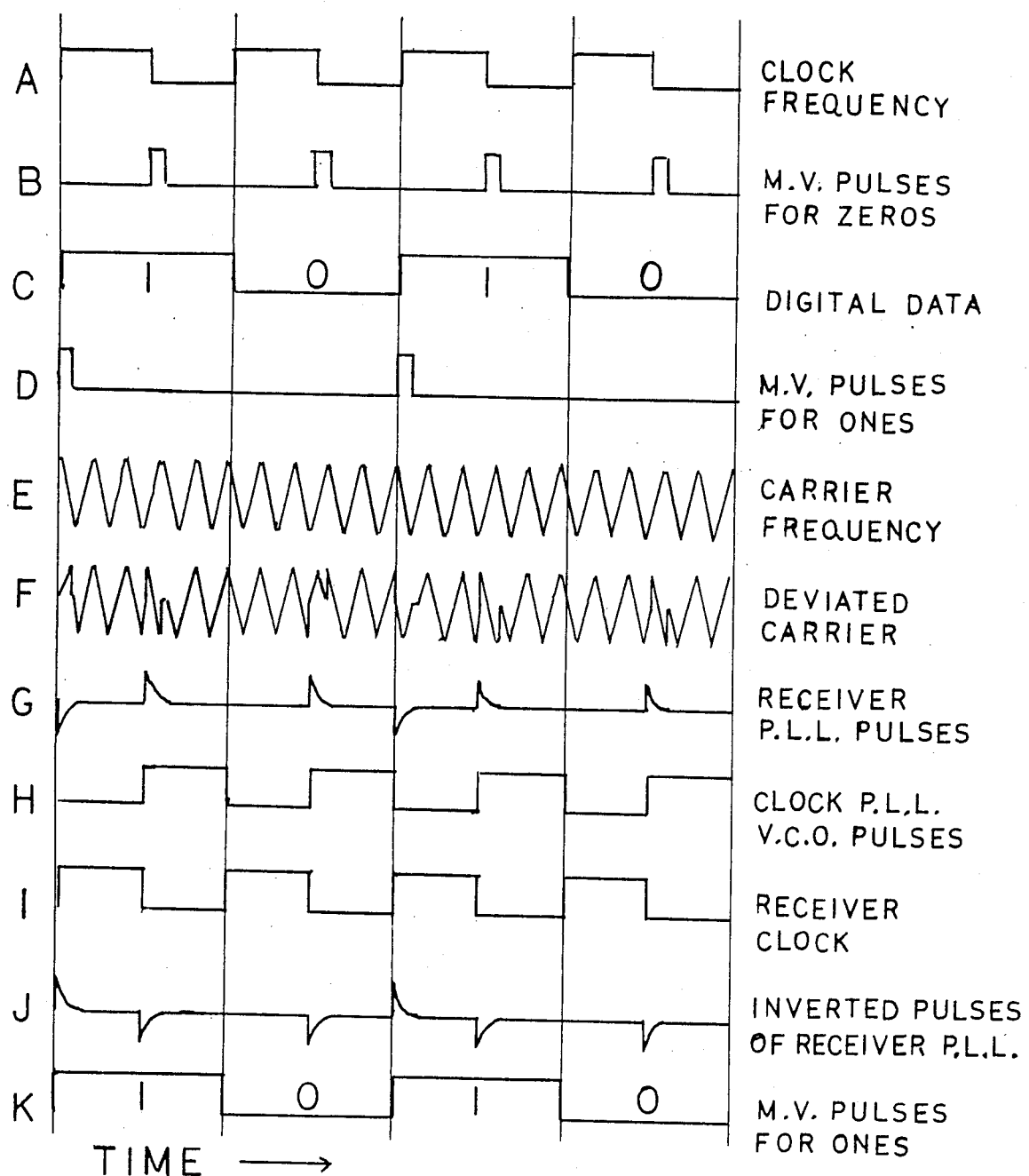

With reference to FIG. 4, which is a schematic diagram of a magnetic tape play back circuit and a digital demodulator circuit, the recorded magnetic tape 82 is transported across the gap of the read head 83 by a transport mechanism not shown, at the same tape speed employed when the tape was recorded. The carrier frequency output of read head 83 is coupled to the input of an amplifier 84 which has a signal output level of approximately 0.2 volt peak to peak. The output of amplifier 84 is coupled to the input of the demodulator circuit denoted by the enclosure 85. The circuit 85 is the entire circuit shown in FIG. 2 with its outputs at terminals 86 and 87. The linear recording of the carrier frequency is read from the tape, amplified to a suitable level, and the digital phase shift information on the sine wave carrier is demodulated to reproduce the digital data recorded on the tape and a coherent clock frequency at output terminals 86 and 87 respectively.

While the preferred embodiments of the invention have been described, the form of the invention should be considered as illustrative and not limiting the scope of the following claims.

I claim:

1. The method of identifying binary digits for modulation by phase shift of a sine wave carrier frequency which comprises:

generating a sine wave carrier frequency;

generating a square wave modulating frequency used as the clock frequency for serial binary digit logic signals;

applying said carrier frequency to the input of a reactive-resistive phase shift circuit including semiconductor switches for controlling said circuit to change the trigonometric sign of the phase angle of said carrier frequency at the output of said circuit;

shifting the phase of said carrier frequency to a leading or negative phase angle at said output by actuating a first said semiconductor switch;

shifting the phase of said carrier frequency to a lagging or positive phase angle at said output by actuating a second said semiconductor switch;

actuating said switches for a time period of one half or less of a cycle of said modulating frequency by digital circuit means responsive to said logic signals and to said modulating frequency;

identifying a first type of binary digit by a phase shift of one trigonometric sign at the start of a cycle of said modulating frequency and by a phase shift of the opposite trigometric sign at the middle of said cycle and identifying a second type of binary digit by a phase shift at the middle of a cycle of said modulating frequency of the same trigonometric sign used at the middle of a said cycle for identifying said first type binary digit, whereby said types of said binary digits can be unambiguously identified for demodulation by said phase shifts and whereby every said "binary" digit provides a phaes shift synchronization signal for demodulation and recovery of said clock frequency.

2. An improved pulsed bi-phase digital modulator circuit comprising:

a source of a sine wave carrier frequency;

a source of a square wave modulating or clock frequency;

a source of serial binary digit logic signals synchronized by said clock frequency;

reactive and resistive circuit means for shifting the phase of said carrier frequency including semiconductor switching means for controlling the trigonometric sign of the phase angle of said carrier frequency during a pulse period of one half or less the period of a cycle of said modulating frequency;

digital circuit means responsive to said logic signals and to said modulating frequency and controlling said semiconductor switching means whereby a first type of said binary digit controls actuation of said switching means to deviate the phase angle of said carrier frequency to one trigonometric sign at the start of a cycle of said modulating frequency and to a phase angle of opposite trigonometric sign at the middle of said cycle and whereby the second type of said binary digit controls actuation of said switching means to deviate the phase angle of said carrier frequency at the middle of a cycle of said modulating frequency to the same trigonometric sign used at the middle of a cycle of said modulating frequency for said first type digit.

3. A system for encoding binary digital signals in the form of phase deviations of a sine wave carrier frequency which comprises:

means for generating a clock frequency of sqaure wave form;

means for generating a sine wave carrier frequency higher than said clock frequency;

means for deviating the phase of said carrier frequency for a period less than one half the period of a cycle of said clock frequency;

a source of binary digital signals clocked serially by said clock frequency;

digital signal processing means responsive to said clock frequency and to said binary digital signals and controlling said phase deviation means in a manner to deviate the phase of said carrier frequency at the start and at the middle of a cycle of said clock frequency to encode a first type of binary digit, and to deviate the phase of said carrier frequency at the middle of a cycle of said clock frequency to encode the second type of binary digit.

4. A system for encoding binary digital signals in the form of phase deviations of a sine wave carrier frequency which comprises:

means for generating a clock frequency of square wave form;

means for generating a sine wave carrier frequency higher than said clock frequency;

means for deviating the phase of said carrier frequency for a period less than one half the period of a cycle of said clock frequency;

a source of binary digital signals clocked serially by said clock frequency;

digital signal processing means responsive to said clock frequency and to said binary digital signals and controlling semi conductor switching means by brief pulses in a manner to briefly deviate said carrier frequency phase to a trigonometric angle of one sign at the start of a cycle of said clock frequency and to a trigonometric angle of the opposite sign at the middle of a cycle of said clock frequency to encode a first type of binary digit, and to briefly deviate said carrier frequency phase to a trigonometric angle of said opposite sign at the middle of a cycle of said clock frequency to encode the second type of binary digit.

* * * * *